(12) United States Patent
Edlund et al.

(10) Patent No.: US 7,769,010 B2
(45) Date of Patent: Aug. 3, 2010

(54) PTP/PTM TRANSMISSION DECISIONS

(75) Inventors: Peter Hans Edlund, Tumba (SE); Karl Olof Joakim Bergström, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 215 days.

(21) Appl. No.: 11/722,994

(22) PCT Filed: Jun. 14, 2005

(86) PCT No.: PCT/SE2005/000899

§ 371 (c)(1),
(2), (4) Date: Jan. 24, 2008

(87) PCT Pub. No.: WO2006/073338

PCT Pub. Date: Jul. 13, 2006

(65) Prior Publication Data

US 2009/0022080 A1     Jan. 22, 2009

(30) Foreign Application Priority Data

Jan. 7, 2005     (SE) .................................... 0500080

(51) Int. Cl.
*H04L 12/28* (2006.01)
*H04L 12/56* (2006.01)

(52) U.S. Cl. .................. 370/390; 370/312; 370/315; 370/328; 455/435.1

(58) Field of Classification Search ............... 370/254, 370/351, 390, 395.32; 455/436–439, 515, 455/560
See application file for complete search history.

(56) References Cited

U.S. PATENT DOCUMENTS

| 7,349,686 | B2 * | 3/2008 | Hayashi, Sadafuku ... 455/412.2 |
| 2004/0152453 | A1 * | 8/2004 | Hayashi ................... 455/412.2 |
| 2004/0229629 | A1 * | 11/2004 | Yi et al. .................... 455/452.2 |
| 2005/0041610 | A1 | 2/2005 | Lee et al. |
| 2006/0285512 | A1 * | 12/2006 | Lee et al. ...................... 370/328 |
| 2007/0105557 | A1 * | 5/2007 | Israelsson et al. ........... 455/436 |
| 2007/0287392 | A1 * | 12/2007 | Sagne et al. ................. 455/119 |
| 2008/0240215 | A1 * | 10/2008 | Nobukiyo et al. ........... 375/225 |
| 2009/0180417 | A1 * | 7/2009 | Frost et al. ................... 370/312 |

FOREIGN PATENT DOCUMENTS

| WO | WO2004073345 | * | 8/2004 |
| WO | WO 2004073345 A1 | | 8/2004 |
| WO | WO2004100402 | * | 11/2004 |
| WO | WO 2004100402 A1 | | 11/2004 |
| WO | WO 2005079101 A1 | | 8/2005 |

OTHER PUBLICATIONS

"Mechanisms for counting and re-counting MBMS users in idle/URA PCH like state" 3GPP TSG-RAN2/3 Joint MBMS Meeting #1. Conference Proceedings Article, Jan. 15, 2003 p. 1-2 See the whole document.

* cited by examiner

*Primary Examiner*—Ayaz R Sheikh
*Assistant Examiner*—Mounir Moutaouakil

(57) ABSTRACT

A retransmission correction performed by counting means provided in a controlling radio network controller (RNC) within a radio access network in the counting of multimedia service joined mobile terminals located in a cell for a PTP/PTM transmission decision, in the case of a repetition of a multimedia service session. The retransmission correction uses an estimated number of the mobile terminals having received a previous transmission of said multimedia service session from any radio network controller.

24 Claims, 7 Drawing Sheets

PTP/PTM TRANSMISSION DECISIONS

TECHNICAL FIELD OF THE INVENTION

The present invention relates to optimised PTP/PTM transmission decisions in multicasting of a multimedia service session to mobile terminals within a radio access network, e.g. mobile terminals subscribing to an MBMS (Multimedia Broadcast/Multicast Service) of the 3GPP (Third Generation Partnership Project).

BACKGROUND OF THE INVENTION

The 3GPP-standard relates to technology based on radio access networks, such as the UTRAN (the Universal Mobile Telecommunications (UMTS) Terrestrial Radio Access Network), which is a radio access network architecture providing W-CDMA (Wideband Coding Division Multiple Access) to mobile terminals, which in the 3GPP are referred to as UEs. Telecommunication systems according to the 3GPP-standard offer higher and variable bit-rates and are capable of providing new types of services to the users. The MBMS included in the 3GPP-standard provides broadcasting/multicasting of various multimedia information to users, enabling information providers to transmit multimedia information, such as real-time audio and video, still images and text, e.g. news, sport results and weather forecasts, to several joined MBMS subscribers simultaneously.

In a telecommunication system according to the 3GPP-standard, a UE, i.e. a mobile terminal, such as e.g. a cellular telephone provided with a SIM (Subscriber Identity Module)-card, communicates with a core network connected to external networks, e.g. the Internet and the PSTN (the Public Switched Telephone Network), via a UTRAN covering a geographical area divided into cells with unique identities. Each cell is served by a base station device, which in the 3GPP is referred to as a Node B, and the radio coverage of a cell is provided by a base transceiver station at the serving base station (i.e. Node B) site over an Uu-interface. One Node B is normally serving more than one cell, and the Node Bs are controlled by RNCS (Radio Network Controllers), which are managing important transmission resources of the UTRAN and are connected to one or more core networks. The Node Bs are communicating with the RNCs over an Iub-interface, the RNCs are communicating with the core network over an Iu-interface, and the communication between RNCs is performed over an Iur-interface. The UTRAN interfaces (Iu, Iub and Iur) have one control plane and one user plane, and the RNSAP (Radio Network Sub-system Application Part) is a control plane protocol for the Iur-interface.

A network architecture for providing an MBMS data stream to a number of MBMS-joined mobile terminals (UEs) located in cells served by a common Node B comprises a BM-SC (Broadcast/Multicast-Service Center) as a source for scheduling the MBMS data streams for delivery to a Serving GPRS Support Node (SGSN) using suitable transmitting means, the SGSN being configured with a Gateway GPRS Support Node (GGSN). An RNC supervising the Node B, i.e. a controlling radio network controller (CRNC) receives the MBMS data stream from the SGSN for transmission to the Node B over an Iub interface, and the Node B forwards the MBMS data stream over an air interface (i.e. Uu-interface) to the MBMS-joined UEs located in the cells served by the Node B.

In a radio access network (RAN), such as the UTRAN, a radio network controller (RNC) will function as a Serving RNC (SRNC) for a specific UE, while the UE is connected to the RAN, also when the UE moves over a large geographical area and passes through several cells, until the UE is disconnected from the UTRAN, e.g. at power off, or when the UE is converted to an idle mode due to inactivity, i.e. an RRC Connection Release. An RNC to be functioning as an SRNC for a specific UE will receive an Iu-link from the core network comprising information regarding the UE, create a UE context and store the received information regarding the UE therein. A UE context indicates the cell location of said UE and information regarding the connection of the UE between the core network and the radio network via the Iu interface. The RNC functioning as an SRNC for a UE will control the connection of the UE within the radio access network until the UE is disconnected at power off. If the UE relocates to a cell controlled by a second, different RNC than the SRNC, the SRNC will send a link forwarding the UE information over the Iur-interface (i.e. an Iur-link) to said second RNC, which will store the linked UE information and function as a drift RNC (DRNC) regarding said UE, while the UE is located in any of the cells controlled by said second RNC. However, an RNC will always function as a Controlling RNC (CRNC) for the UEs located in the cells served by the Node Bs connected to it via the Iub interface, and the CRNC will control the radio resources for those cells. Thus, a physical RNC will normally contain SRNC, DRNC and CRNC functionalities, and will function as either a SRNC/CRNC or a DRNC/CRNC for a specific UE. Regarding the radio resource control (RRC), the UE operates either in an Idle Mode or in a Connected Mode, and the UE automatically enters the Idle Mode at power on, before a connection is established between the UE and a UTRAN. When a connection is established, the UE enters a Connected Mode, and is assigned a U-RNTI (a UTRAN Radio Network Temporary Identity), which can be used in any cell of UTRAN. Within the Connected Mode, there are four different states, i.e. the CELL_DCH (Dedicated Channel) state, the CELL_FACH (Forward Access Channel) state, the CELL_PCH (Paging Channel) state and the URA_PCH state. In the CELL_DCH state, a dedicated traffic channel is allocated to the UE, in the CELL_FACH state the UE monitors a common channel (the FACH) continuously in the downlink of the selected cell and uses a RACH (Random Access Channel) as uplink, and in the CELL_PCH state the UE monitors a paging channel of a selected cell. The cell location of UEs in any of these states is stored in the UE context in the SRNC, and at cell relocation, the UE will update the UE context in the SRNC with its new cell location by sending a cell updating message to its SRNC. However, while a UE is in the fourth connected state, the URA_PCH state, the exact cell location of the UE will not be stored in the UE context in the SRNC. Instead, the UE context will contain information regarding the location of the UE only at a cell group level, i.e. regarding which URA (UTRAN Registration Area) the UE is located in. A URA may span over cells served by Node Bs connected to different RNCs, and the UE will update the UE context with its new URA location only when crossing a URA border by sending a URA updating message to the SRNC.

The relationship between a service provider of an MBMS multimedia service according to the 3GPP and a user, i.e. a mobile terminal, which in the 3GPP normally is referred to as a UE, is established as an MBMS subscription, allowing the user to receive the related MBMS information. When a user wishes to receive MBMS information, he activates the MBMS, indicating to the radio access network that he is prepared to receive multimedia information associated with a specific MBMS. Thereby, he joins a multicast group for reception of a MBMS data stream transmitted by multicasting, and MBMS information regarding the TMGI (Temporary Multicast Group Identity) is added to the UE context in the SRNC, thereby creating an MBMS UE context. When the user no longer wishes to receive any MBMS information, he deactivates the MBMS and resigns from the multicast group.

In transmission by multicasting, two different transmission schemes may be used to transmit the data stream in a cell, either the point-to-point (PTP) scheme or the point-to-multipoint (PTM) scheme, depending on the number of users located in the cell. In transmission according to the PTP scheme, the data stream is delivered to each user individually, using a dedicated traffic channel, and in transmission according to the PTM scheme, the same data stream is sent on a common channel, which can be received simultaneously by a plurality of UEs. The PTM scheme is advantageous when the number of receivers in a cell is large, and the PTP scheme is advantageous when only a few receivers are located in the cell. Transmission according to the PTM scheme avoids duplication of the same content on different radio bearers, thereby saving transmission resources, while the transmission power overhead required for transmission on a common channel is avoided by transmission according to the PTP scheme. Therefore, the allocation of the available radio resources can be optimised by counting of the MBMS-joined UEs located within each cell and selecting between the PTM scheme and the PTP scheme in a so called PTP/PTM transmission decision, which is based on the result of said counting procedure.

When a UE subscribing to an MBMS service has activated the MBMS and joined an MBMS multicast group, the identity of the temporary MBMS multicast group is stored in the MBMS UE context in the SRNC, as well as in the SGSN. An MBMS service provider will initiate an MBMS session by sending an MBMS session start notification to inform the joined UEs in the multicast group that an MBMS data stream will be transmitted. In order to decide whether to use the PTP scheme or PTM scheme in the multicasting of the MBMS data stream, the controlling radio network controller, CRNC, will perform a counting procedure of all MBMS-joined UEs located within the cells served by the Node Bs supervised by each CRNC. The result of the counting serves as a basis for the PTP/PTM transmission decision, i.e. it is used by the CRNCs to select the PTM scheme or the PTP scheme for transmission of an MBMS data stream to MBMS-joined UEs located in each cell controlled by the CRNC.

The counting of MBMS-joined UEs in a Connected mode in a specific cell is normally performed by counting the MBMS UE contexts indicating the specific cell location. More specifically, the counting of MBMS-joined UEs for a PTP/PTM transmission decision is performed by the CRNC updating cell counters for each cell, either a separate cell counter for each UE state, or one common cell counter. The cell counters for each cell are updated according to a predefined cell counter updating procedure, and before transmitting the MBMS data stream in a cell, the CRNC compares the value of the corresponding cell counter or cell counters with an operator-defined threshold value. Following the comparison, PTM-transmission in a cell is selected if the value of the corresponding cell counter is approximately above said threshold and otherwise PTP-transmission is selected. A prior art cell counter updating procedure for a PTP/PTM transmission decision before MBMS multicasting may e.g. comprise updating the cell counters after counting of MBMS UE contexts indicating the specific cell location, updating the counters at a received MBMS UE link from the core network or from an SRNC indicating the specific cell location, by dedicated paging of certain UEs and updating the counters accordingly, and by counting by notification, which involves updating the counters after receiving a Cell Update-message from a UE as a response to an MBMS notification of a MBMS session start. The step of counting the MBMS UE contexts is applicable to most UEs in the Connected mode, but gives only a fractional counting of Connected mode UEs in the URA_PCH state and in the Idle mode. Therefore, counting by notification or counting by paging is normally required for Idle mode UEs and for Connected mode UEs in the URA_PCH state. Counting by notification is not applicable for UEs in the CELL_DCH-state, which must be counted by counting of UE contexts or by UEs links received from the core network over the Iu-interface or from a serving RNC over the Iur-interface. The combination of the counting procedures described above depends on the state of a UE and on the operator, and hereinafter cell counter updating triggered by counting of MBMS UE contexts or by receiving MBMS UE link is defined as counting by linking, and cell counter updating triggered by receiving a response to dedicated paging of a UE or to an MBMS session start notification is defined as counting by paging.

At the start of an MBMS session and during a session, counting by linking, i.e. counting of the UE contexts and of UE links, gives the exact number of UEs in a cell in the Connected state. However, the UEs in the URA_PCH state are not counted accurately by this method, since the exact cell location is unknown for these UEs. Only an estimated number of UEs per cell can be calculated, e.g. by means of a fractional counting procedure, by calculating the number of URA_PCH mobiles in the URA divided with total number of cells in the URA. Another counting procedure involves an estimation of the number of UEs, assuming that each UE is still located in the cell from which the last message was sent to the network. The UEs in the Idle mode can also, optionally, be counted by means of fractional counting, as a fractional number per cell and registration area calculated by the CRNC, based on the number of UEs interested in MBMS, which is received at session start from the core network and is updated during session.

One drawback with prior art cell counter updating procedures is that neither counting by linking nor counting by paging are completely accurate. In counting by paging for a retransmission of an MBMS session, i.e. a repetition, errors will occur, e.g. since a UE will not respond to counting by notification if it has already received a MBMS session correctly, and since a cell update sent as a response to counting by notification does not include any MBMS ID. An important drawback with counting by paging is that it involves dedicated paging of UEs, which increases the signaling load over the Uu interface, and requires more transmission resources than counting by linking. Another drawback in prior art cell counting procedures is that certain factors are not considered in the PTP/PTM transmission decision, such as repetition of the MBMS session, the reception in PTP-mode and the predicted reception of a transmitted MBMS session in the PTM-mode. In order to indicate a repetition of an MBMS session, i.e. a retransmission of an MBMS data stream, an MBMS session ID, indicating the version of a specific multimedia service, can be stored in the MBMS UE context regarding each transmission, in association with the MBMS service ID. However, the retransmission can only be detected in case the retransmission is performed by the same RNC as the original transmission.

Therefore, the aim of the present invention is to solve the problems described above relating to counting of the multimedia service joined mobile terminal located in a cell for the PTP/PTM transmission decision, especially of UEs in the 3GPP, to be able to optimise the PTP/PTM transmission decision performed by the CRNC before the multicasting of a multimedia service stream in a cell, thereby optimising the radio resource allocation.

DESCRIPTION OF THE INVENTION

It is an object of the present invention to provide an improved counting of multimedia service joined mobile terminals located in a cell for the PTP/PTM transmission decision, before the multicasting of a multimedia service session in said cell. More specifically, the object of the invention is to provide an improved counting of MBMS-joined UEs located in a cell for the PTP/PTM transmission decision performed by a CRNC within a UTRAN of 3GPP, before the multicasting of an MBMS session in the cell.

These and other objects are achieved by the method in a radio network controller and the radio network controller according to the attached claims.

The claims relate to a method in a controlling radio network controller (RNC) within a radio access network for counting of multimedia service joined mobile terminals located in a cell for a PTP/PTM transmission decision. In the method, a retransmission correction of a counted number of mobile terminals is performed in case of a repetition of a multimedia service session, using an estimated number of the mobile terminals having received a previous transmission of said multimedia service session from any radio network controller. The retransmission correction comprises the following steps:

Reception of a repetition indicator in the multimedia session start notification from the core network;

Collection of PTP/PTM information regarding previous transmissions of said multimedia service session stored in the mobile terminal contexts and in mobile terminal links received from serving radio network controllers;

Calculation of a repetition correction value using said collected PTP/PTM information;

Correction of a counted number of multimedia service joined mobile terminals using said repetition correction value;

Storage of said repetition indicator and PTP/PTM information regarding said repetition of the multimedia service session in the mobile terminal contexts, and in mobile terminal links transferred to serving radio network controllers.

The repetition indicator may comprise a repetition flag or a repetition counter.

The calculation of the repetition correction value may involve an addition of the number of mobile terminals having received a previous PTP-transmission of said multimedia service session, to a predicted number of mobile terminals having received a previous PTM transmission of said multimedia service session, or a prediction of the number of mobile terminal having received a PTM transmission of said multimedia service session in any of the previous transmissions, using an estimated mean value of the number of mobile terminals located in a cell.

Mobile terminal context information comprising PTP/PTM information regarding a received multimedia service session may be transferred the core network at a connection release of a mobile terminal.

The counting of multimedia service joined mobile terminals may comprise Idle mode counting, involving the reception of mobile terminal information from the core network, comprising PTP/PTM information regarding a received multimedia service session.

The counting of the multimedia service joined mobile terminals may comprise a first counting by linking-procedure, and a consecutive and optional counting by paging-procedure, and may comprise the following consecutive steps;

Updating a cell counter for each stored mobile terminal contexts and received mobile terminal link indicating the cell location;

A comparison between the cell counter value and a pre-defined threshold value, and a selection of PTM-transmission in the cell if the cell counter value is approximately higher than said thresholds value and of a counting by paging-procedure if the cell counter value is lower than said threshold value;

A comparison between the cell counter value, following the counting by paging-procedure, and said pre-defined threshold value, and a selection of PTM-transmission in the cell if the cell counter value is approximately higher than said threshold value and of PTP-transmission in the cell if the cell counter value is lower than said threshold value.

The counting by paging-procedure may comprise paging of mobile terminals in the URA_PCH-state, in case fractional URA_PCH-state counting is not activated, and paging of mobile terminals in the Idle mode, in case Idle mode counting is not activated.

The claims further relate to a radio network controller capable of functioning as a controlling radio network controller (CRNC) within a radio access network, the radio network controller provided with counting means for counting of multimedia service joined mobile terminals located in a cell for a PTP/PTM transmission decision. The counting means comprises retransmission correction means arranged to correct a counted number of mobile terminals in the case of a repetition of a multimedia service session, using an estimated number of the mobile terminals having received a previous transmission of said multimedia service session from any radio network controller. The retransmission correction means further comprises:

Reception means arranged to receive a repetition indicator in the multimedia session start notification from the core network;

Collection means arranged to collect PTP/PTM information regarding previous transmissions of said multimedia service session stored in the mobile terminal contexts and in mobile terminal links received from serving radio network controllers;

Calculating means arranged to calculate a repetition correction value using said collected PTP/PTM information;

Correction means arranged to correct a counted number of multimedia service joined mobile terminals using said repetition correction value; and Storing means arranged to store said repetition indicator and PTP/PTM information regarding said repetition of the multimedia service session in the mobile terminal contexts and in mobile terminal links transferred to serving radio network controllers.

The repetition indicator may comprise a repetition flag or a repetition counter.

The calculation of the repetition correction value may involve an addition of the number of mobile terminals having received a previous PTP-transmission of said multimedia service session to a predicted number of mobile terminals having received a previous PTM transmission of said multimedia service session, or a prediction of the number of mobile terminal having received a PTM transmission of said multimedia service session in any of the previous transmission, by the use of an estimated mean value of the number of mobile terminals located in a cell.

The counting means may be arranged to transfer mobile terminal context information comprising PTP/PTM information regarding a received multimedia service session to the core network at a connection release of a mobile terminal.

The counting means may further be arranged to perform an Idle mode counting procedure in the counting of multimedia service joined mobile terminals, said Idle mode counting procedure involving the reception of mobile terminal information from the core network, comprising PTP/PTM information regarding a received multimedia service session.

The counting means may be arranged to count the multimedia service joined mobile terminals by means of a first counting by linking-procedure and a consecutive and optional counting by paging-procedure, and the counting means may further comprise:

Updating means arranged to update a cell counter for each stored mobile terminal contexts and received mobile terminal link indicating the cell location;

Comparison means arranged to compare the cell counter value with a pre-defined threshold value;

First selecting means arranged to select PTM-transmission in the cell if the cell counter value is approximately higher than said thresholds value and to select a counting by paging-procedure if the cell counter value is lower than said threshold value;

Second selecting means arranged to select PTM-transmission in the cell if the cell counter value, following the counting by paging-procedure, is approximately higher than said thresholds value and to select PTP-transmission if the cell counter value is lower than said threshold value.

The counting by paging-procedure may further involve paging of mobile terminals in the URA_PCH-state, in case fractional URA_PCH-state counting is not activated, and paging of mobile terminals in the Idle mode, in case Idle mode counting is not activated.

The radio access network may be a UTRAN (Universal Mobile Telecommunications Terrestrial Radio Access Network), said mobile terminal may be a UE and said multimedia service may be a Multimedia Broadcasting/Multicasting Service (MBMS), according to the 3GPP standard.

Other features and further advantages of the invention will be apparent from the following description and figures, as well as from the attached claims.

BRIEF DESCRIPTION OF THE DRAWINGS

The present invention will now be described in more detail and with reference to the embodiments and to the drawings, of which.

DESCRIPTION OF PREFERRED EMBODIMENTS

Figure 1:
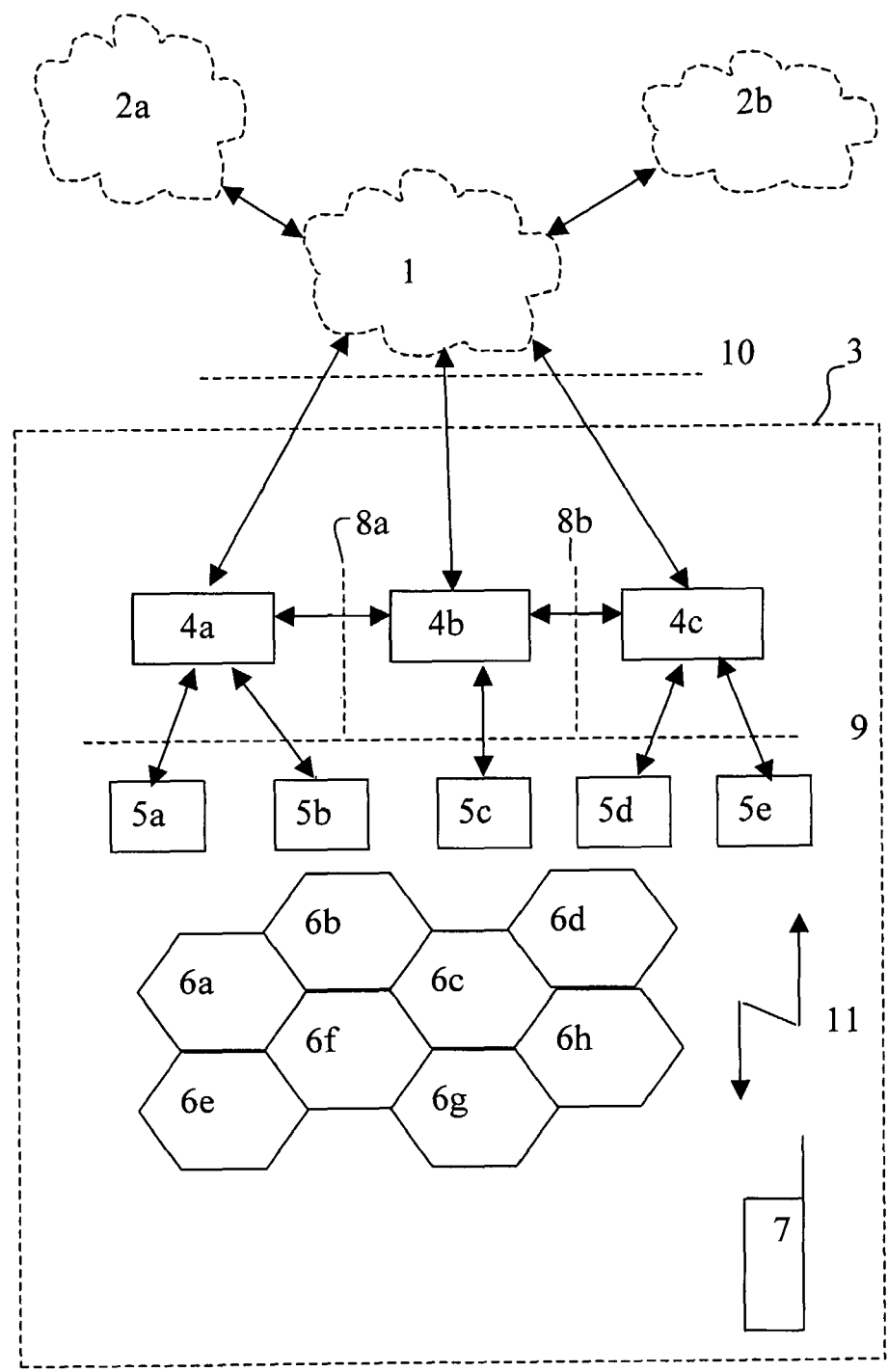
FIG. 1 schematically illustrates a third generation mobile communication system, FIG. 2 schematically illustrates a UE relocation and the links transferring UE context information, FIG. 3 schematically illustrates the distribution of PTP/PTM information between RNCS.

The terms and expressions used in the description and in the claims are meant to have the meaning normally used by a person skilled in the art, and the following abbreviations will be used:
3GPP: Third Generation Partnership Protocol
UMTS: Universal Mobile Telecommunications
UTRAN: UMTS Radio Access Network
MBMS: Multimedia Broadcast/Multicast Service
RNC: Radio Network Controller
CRNC: Controlling RNC
SRNC: Serving RNC
DRNC: Drift RNC
RRC: Radio Resource Control
RAN: Radio Access Network
URA: UTRAN Registration Area
PTP: Point-To-Point
PTM: Point-To-Multipoint
GPRS: General Packet Radio Service
SGSN Serving GPRS Support Node FIG. 1 illustrates a third generation mobile communication system, comprising a core network 1 and a UTRAN 3, in which the core network 1 provides connections to the external networks 2a and 2b, e.g. the Internet, a PSTN (Public Switched Telephone Network), or other mobile networks. The core network 1 is also connected to the UTRAN 3 over an Iu-interface 10, said UTRAN comprising a plurality of RNCs 4a, 4b, 4c, which are interconnected by means of Iur-interfaces 8a and 8b. The RNCs each supervises a number of Node Bs 5a, 5b, 5c, 5d, 5e over an Iub interface 9, and each Node B handles the radio access within one or more cells 6a, 6b, 6c, 6d, 6e, 6f, 6g, 6h. A UE 7 may move between cells, and communicates over an air interface 11 (i.e. a Uu-interface), where the radio coverage in each cell is provided by base transceiver stations (not shown) of a specific Node B.

Figure 2:
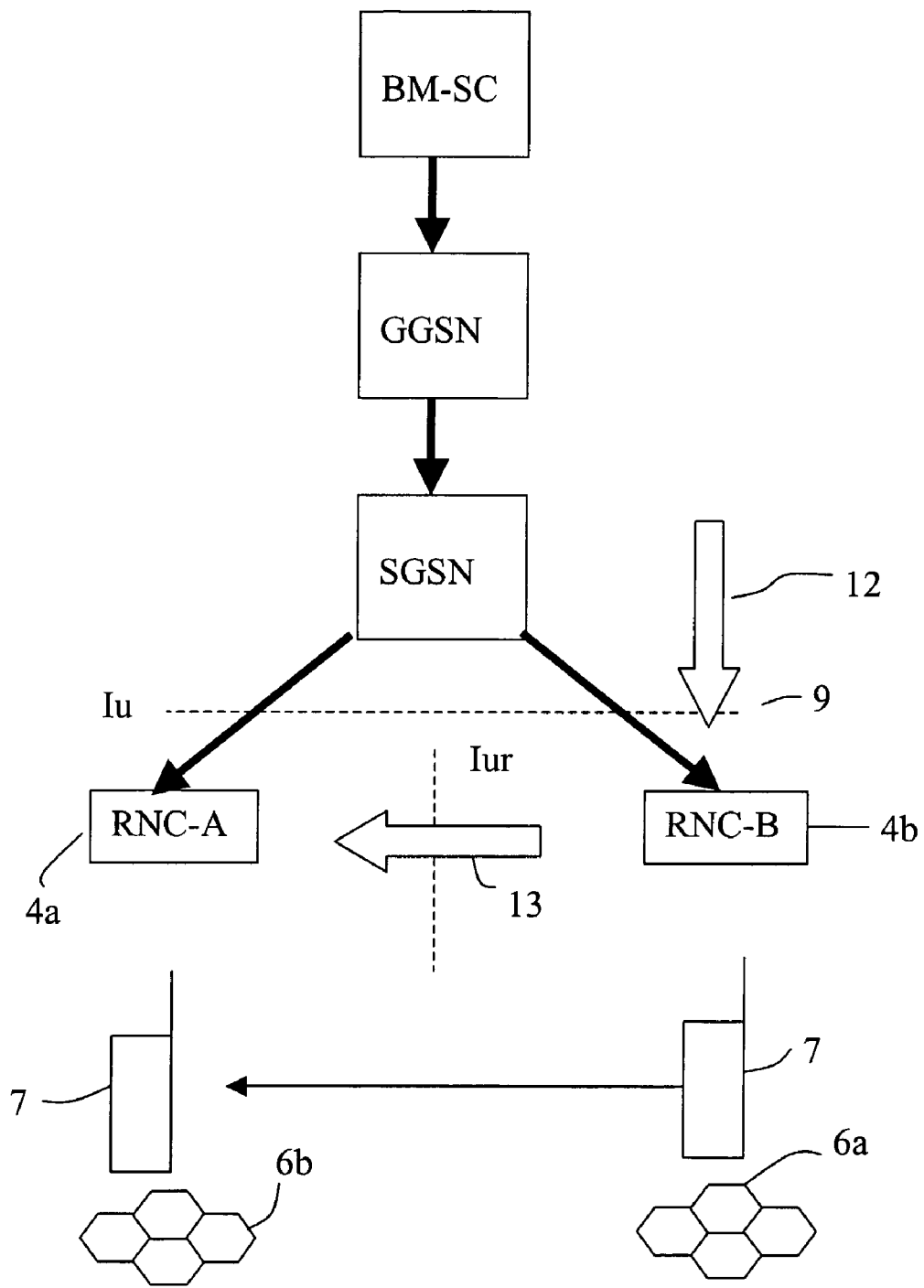

FIG. 2 illustrates a UE relocation and UE links transferring UE context information, and shows schematically a conventional node architecture for providing an MBMS stream to a plurality of cells, comprising a BM-SC (Broadcast/Multicast-Service Center) as a source for scheduling of the MBMS streams. The MBMS stream is forwarded to SGSN (Serving GPRS Support Node) via a GGSN (Gateway GPRS Support Node). In this example, two RNCs, RNC-A 4a and RNC-B 4b, receive the MBMS stream over an Iu interface 9 from the SGSN, to be forwarded to the Node Bs (not shown) supervised by each RNC for transmission to MBMS-joined UEs 7 located in the cells by said Node Bs, the transmission over the air interface (Uu interface) performed by the BTS (Base Transceiver Station) (not shown) of each cell. Initially, at power on, the UE 7 is located in cell 6a, controlled by RNC-B, entering a Connected mode and joining a MBMS Multicast group. As a consequence, the RNC-B receives an Iu-link 12 comprising context information regarding the UE and the MBMS from the core network. The context information is stored in an MBMS UE context in the RNC-B, since it functions as a SRNC regarding UE 7, as well as a controlling RNC, CRNC, i.e. RNC-B functions as a SRNC/CRNC. When the UE is relocated to cell 6b, controlled by RNC-A, the UE 7 will update its SRNC, i.e. RNC-B, with its new cell location by sending a Cell Update to RNC-B, causing the RNC-B to send a Iur-link 13 comprising the information stored in the MBMS UE context to RNC-A, which will function as a DRNC with respect of the UE 7, as well as a CRNC, i.e. as a DRNC/CRNC. Before multicasting an MBMS stream in a cell, a CRNC will perform a counting procedure of the MBMS-joined UEs located in the cell for the PTP/PTM transmission decision. Therefore, when the UE 7 is located in cell 6a (before the relocation), RNC-B will count the UE 7 before transmission in cell 6a by means of the MBMS UE contexts stored in RNC-B, of which the context information was received in the Iu-link 12 from the core network. However, when the UE is located in cell 6b, (after the relocation), the RNC-A will count the UE 7 before transmission in cell 6b by means of the Iur-link 13, which was received from RNC-B and stored as Iur-linked MBMS UE information in RNC-A, indicating e.g. that UE 7 now is located in cell 6b. However, RNC-B remains the role of SRNC for the UE.

The counting procedure according to this invention improves the accuracy of the counting and of the PTP/PTM transmission decision for MBMS multicasting, thereby optimising the radio resource allocation. According to this invention, the counting accuracy is improved by a reduction of the counting errors in case of an MBMS retransmission (a repetition) of an MBMS data stream. There are basically two types of MBMS retransmissions, i.e. the repair case and the non-repair case. The repair case corresponds to a re-join of the MBMS service for UEs that failed to receive a first MBMS transmission, and a request of retransmission of missing blocks to complete a received content, and in the repair case an MBMS UE context will be created. The non-repair case is the FEC (Forward Error Correction) case, in which retransmission is performed a number of times to ensure the reliability of transmission.

According to a first embodiment of this invention, the counting accuracy regarding MBMS retransmissions is improved by adding an MBMS session repetition indicator, such as a repetition flag or a repetition counter (k), in the MBMS session start notification. The repetition indicator is stored in the MBMS UE contexts of the UEs receiving the retransmission, in association with the corresponding MBMS session ID and MBMS service ID, and this MBMS UE context information will also be included in Iur-links transferring information to other RNCs regarding a linked UE. Additionally, information regarding a PTP-transmission performed to the UE on a DTCH (Dedicated Traffic Channel), and information regarding a PTM transmission, as well as the PTM reception probability, in case of an MBMS transmission on FACH which may have been received by the UE, is also stored in the MBMS UE contexts, as well as in the Iur-links transferring MBMS UE information. The information regarding a PTP transmission or a PTM transmission of an MBMS session to a UE is hereinafter referred to as PTP/PTM information.

According to the first embodiment of this invention, the MBMS Session start notification of an MBMS retransmission will comprise MBMS Service Id, MBMS session id and a repetition indicator, such as a flag, a repetition counter (k), or both. In the counting of the MBMS-joined users located in a cell for a PTP/PTM transmission decision, the CRNC utilizes the new repetition information, i.e. the repetition indicator and the PTP/PTM information stored in the MBMS UE contexts or included in the MBMS UE information received in Iur-links from RNCs functioning as SRNCs, to predict the number of UEs that have already received the MBMS session, and to correct the counted number of UEs by calculating a repetition correction value and subtracting said repetition correction value from the counted number of MBMS-joined UEs. According to this invention, a CRNC calculates a repetition correction value when receiving an MBMS Session start notification comprising an MBMS transmission repetition indicator, the repetition correction value being a prediction of the number of UEs having already received the MBMS session.

The repetition correction value may be calculated either as the predicted number of UEs having received the MBMS session as a PTP transmission or as a PTM transmission from the CRNC or any other RNC, hereinafter defined as an MBMS PTP/PTM transmission number, or as a predicted number of UEs having received the MBMS session by means of any of the previous PTM transmissions/repetitions of the MBMS session, hereinafter defined as an MBMS retransmission number.

The MBMS PTP/PTM transmission number may be calculated as:

$$\Sigma UE \text{ (in PTP)} + p \times \Sigma UEs \text{ (in PTM)} \tag{1}$$

For a PTM-transmission the counting factor is set to p, i.e. the probability to receive the MBMS transmission, and for a PTP transmission the counting factor may preferably be set to 1, and this counting factor is, therefore, omitted in the expression (1) above.

Thus, the MBMS PTP/PTP-transmission number indicates the number of UEs having already received the MBMS session, either in the present cell location or in a previous cell location, by MBMS multicasting performed either by the present CRNC of by any other RNC.

In case the MBMS session repetition indicator comprises a counter k, thereby indicating the repetition sequence number, the CRNC may alternatively, according to a second embodiment of this invention, calculate the repetition correction value as the MBMS retransmission number, i.e. a predicted number of UEs having received the MBMS session by means of any of the previous MBMS session PTM transmissions/repetitions in a cell, and this number may be calculated as:

$$p \times n\Sigma(1-p)^k, \text{ where } k \in (0,m). \tag{2}$$

k is preferably the retransmission sequence number or the retransmission sequence number minus 1, and n is the predicted number of MBMS-joined UEs in the cell during the session, which is calculated as a mean value of the number of MBMS-joined UEs in a cell during the session.

Thus, when the repetition indicator comprises a counter k, the repetition correction value may be calculated either as the MBMS PTP/PTM transmission number, e.g. according to (1) above, or as an MBMS retransmission number, e.g. according to (2) above. However, when the repetition indicator consists of a flag, the repetition correction value can only be calculated as the MBMS PTP/PTM transmission number, according to (1) above.

According to this invention, a CRNC may perform a correction of a counted number of MBMS-joined UEs in the counting for the PTP/PTM transmission decision before multicasting an MBMS session retransmission, preferably by subtracting a calculated repetition correction value from the counted number or UEs, the calculated value being an estimation of a predicted value of UEs having already received the MBMS session, by the CRNC or by any other RNC.

Figure 3:
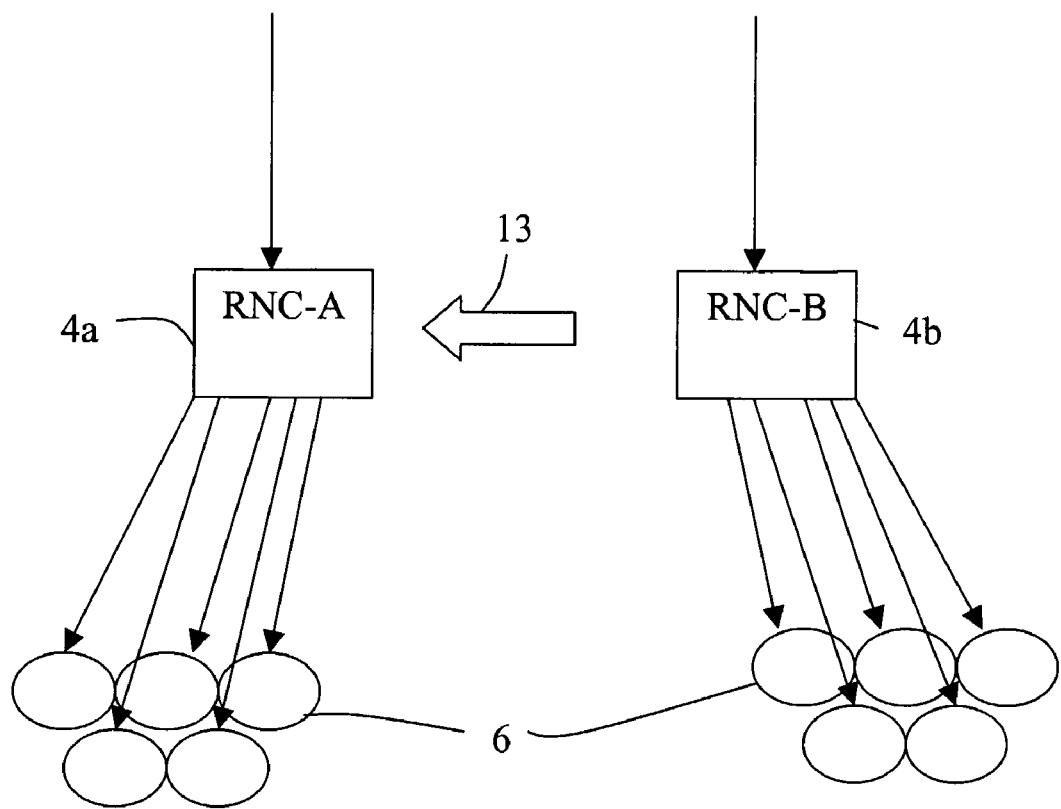

The distribution of PTP/PTM information according to one exemplary embodiment of this invention will now be described with reference to FIG. 3, when a multicast MBMS session is transmitted from BM-SC to RNC-A 4a and RNC-B 4b, and repeated a number of times. Due to the mobility in RAN, some of the UEs (not shown) located in a cell 6 controlled e.g. by RNC-A have relocated to this cell from a cell controlled by another RNC, e.g. RNC-B, via cell re-selection, thereby causing a linking procedure to be performed over the Iur interface. An Iur-link 13 transferred from RNC-B to RNC-A will, in accordance with this invention, comprise PTP/PTM information regarding a relocated UE, for which the RNC-A now constitutes a DRNC/CRNC, if the UE has received an MBMS session while located in a cell controlled by RNC-B. PTP information regarding relocated UEs having received the MBMS session via a dedicated traffic channel will also be stored as linked information in the DRNC/CRNC. When an MBMS session is repeated, the BM-SC includes a repetition indicator in the MBMS session start, and the CRNCs will count the number of MBMS-joined UEs based on MBMS UE contexts and received MBMS UE information. Since the MBMS session is a repetition, the CRNCs may additionally calculate an MBMS PTP/PTM transmission number, according to (1) above, based on PTP/PTM information received from any other RNC having transmitted the service, and make a PTP/PTM transmission decision based on the calculated MBMS PTP/PTM transmission number, by subtracting this number from a counted number of MBMS-joined UEs. Alternatively, in case the repetition indicator comprises a counter k, the CRNC may calculate an MBMS retransmission number, according to (2) above, and base said PTP/PTM transmission decision on this value, by subtracting it from a counted number of MBMS-joined UEs. Thereafter, at start of the repeated session, the CRNCs will configure each cell for PTP- or PTM-transmission of the MBMS session, and store information regarding a performed PTP transmission or a PTM transmission of a MBMS session to a UE as PTP/PTM information in the MBMS UE contexts, and include it in Iur-links transferring MBMS UE information to other RNCs.

Figure 4:
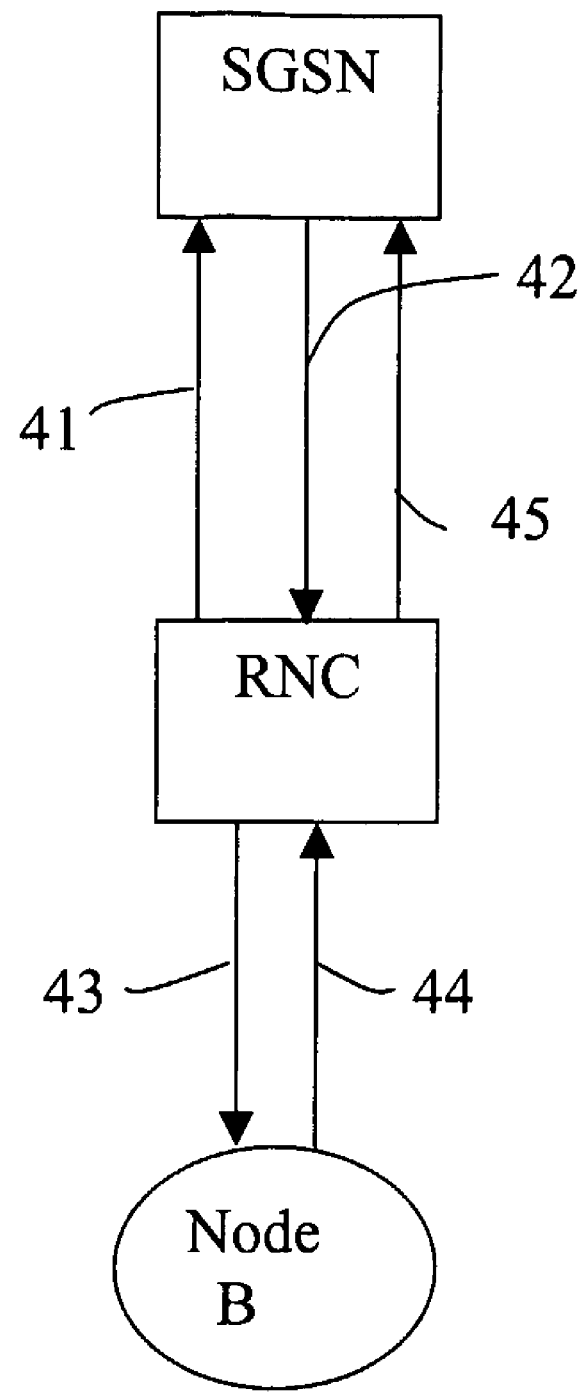
FIG. 4 illustrates the MBMS UE information transfer performed at a RRC Connection Release.

According to a third embodiment of this invention, the counting procedure may be further improved by transferring said PTP/PTM information to the core network at RRC Connection Release of a UE, as illustrated in FIG. 4. When a UE transits back to the Idle mode from the Connected mode, i.e. a RRC connection release, information is sent to SGSN comprising information regarding UEs in the Idle Mode having received the session, to be used by the RAN before a retransmission in the counting of UEs in the Idle mode for the PTP/PTM transmission decision. The arrow 41 indicates a Release Request sent from the RNC to the SGSN of the core network. The arrow 42 indicates the RRC Connection Release issued by the SGSN to the RNC, forwarded to the Node B, as indicated by arrow 43. Arrow 44 indicates the RRC Connection Release Complete from the Node B to the RNC, which is forwarded to the SGSN, as indicated by arrow 45. According to this invention, the Release Complete-signaling is extended by an addition of the MBMS UE context information, comprising PTP/PTM information regarding a received MBMS session. In case of a repetition of the MBMS session, the SGSN may include this information in the MBMS session start to the RNC. This information transfer between the SGSN and the RNC is hereinafter defined as Idle-mode counting.

According to a fourth embodiment of this invention, the counting procedure is further improved by an optimisation of the process of counting of UE contexts and UE links, defined as counting by linking, and by counting by notification and by paging, defined as counting by paging. The counting by UE context and UE links occurs when the CRNC updates a cell counter due to an UE link received from the core network, i.e. an Iu-link, or from an SRNC, i.e. an Iur-link, and the UE link includes context information, such as the UE ID and the MBMS ID. The counting by notification involves the CRNC sending an MBMS notification at a session start, receiving a Cell Update-message from a UE. According to this invention, both the stored MBMS UE contexts and the MBMS UE information received in Iur links is extended by information regarding MBMS service ID, MBMS session ID, MBMS session repetition, and information regarding PTP- or PTM-reception of said MBMS session, i.e. defined as PTP/PTM information. The accuracy of the counting of the MBMS-joined UEs will vary depending on the counting method. In counting by notification, the CRNC sends an MBMS notification at a session start and receives a Cell Update-message from the UE located in the cell and interested in receiving the MBMS session. In order to retrieve more accurate information regarding the number of UEs interested in receiving a specific MBMS transmission, either a first MBMS transmission or a retransmission, the MBMS notification according to this invention includes a probability factor set to a very low value. A UE receiving a paging including a probability factor will draw a random number and respond accordingly, and a lower probability factor results in responses from a higher percentage of the UEs. According to one embodiment of the invention, the probability factor is different in a retransmission that in the first transmission.

According to this invention, the MBMS UE contexts and MBMS UE links are provided with additional information regarding an MBMS Service ID and Session ID, MBMS Session repetition, and PTP/PTM information. In case of an MBMS retransmission, which is indicated by a repetition indicator in the MBMS Session Start, the CRNC may calculate a repetition correction value, and subtract said value from the counted number of UEs interested in receiving the MBMS transmission, in order to reduce the counting errors at retransmissions.

However, according to the above-mentioned fourth embodiment of this invention, the counting procedure is further improved by an optimisation of the process of counting by linking and counting by paging, such that the counting by linking of the UEs in a cell is performed first, and the number of counted UEs compared with a operator defined threshold value. In case the number of UEs e.g. approximately exceeds said threshold value, PTM transmission is selected for the cell. Otherwise, the UEs is counted by means of counting by paging, and if the number of UEs still not reaches the threshold value after performing counting by paging, the CRNC will select PTP transmission in the cell.

Consequently, the counting procedure according to the fourth embodiment of this invention comprises two consecutive counting procedures, of which the second procedure is optional, depending on the number of UEs located in the cell. The first procedure performs counting of UE contexts and of received UE links, which hereinafter is defined as a the counting by linking-procedure, and a second procedure performs counting by notification and dedicated paging, which hereinafter is defined as the counting by paging-procedure, said second procedure only performed if required, after performing a comparison with a defined threshold value. According to this fourth embodiment of the invention, only the counting by linking-procedure has to be performed if a sufficiently large number of UEs are located in a cell, and a counting by paging-procedure has to be performed after the counting by linking-procedure only in the case of a comparatively smaller number of UEs located in a cell. In the counting by linking-procedure, the UE contexts and received UE links are counted for each of the connected states in each cell, and between each connected state the value of the cell counters may be compared with the threshold value. If the value of a cell counter is e.g. approximately above the threshold, the CRNC will initiate a PTM-transmission in the cell. When all the connected states UEs are counted, and the cell counter value is still not e.g. above the threshold for PTM-transmission, the second, counting by paging-procedure will be initiated. In this procedure, the Connected mode URA_PCH-state UEs in the cell will be paged, unless a fractional counting-step of URA_PCH-state UEs was included in the counting by linking-procedure. In the counting by paging-procedure, the Idle-mode UE will be counted by paging, unless an Idle-mode counting procedure is activated. Between each counting procedure, the value of the cell counter is compared with the threshold value, and if the counter value is e.g. approximately above the threshold value, the PTM-transmission scheme is selected by the CRNC. However, if the counter value is not approximately above the threshold value after completion of both the consecutive counting procedures, the CRNC will select the PTP transmission scheme. By means of this counting procedure, which comprises two partial procedures, a first counting by linking-procedure and an optional, consecutive counting by paging-procedure, which is only performed if the value of a cell counter is not large enough after the counting by linking-procedure to motivate a PTM-transmission decision, unnecessary dedicated paging can be avoided and expensive radio transmission resources saved.

Figure 5:
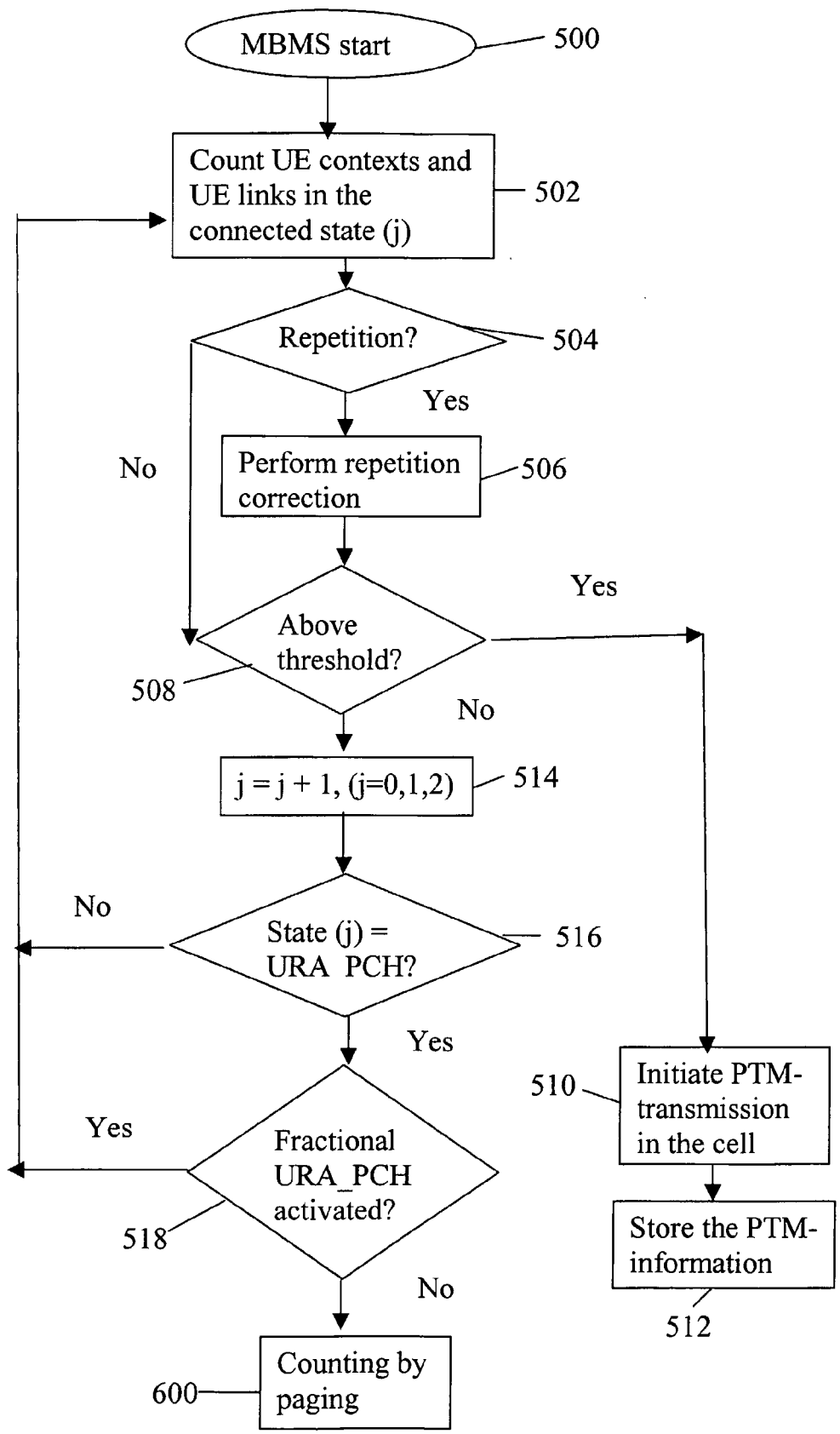
FIG. 5 is a flow diagram illustrating the a first part of a counting procedure for a PTP/PTM transmission decision.
Figure 6:
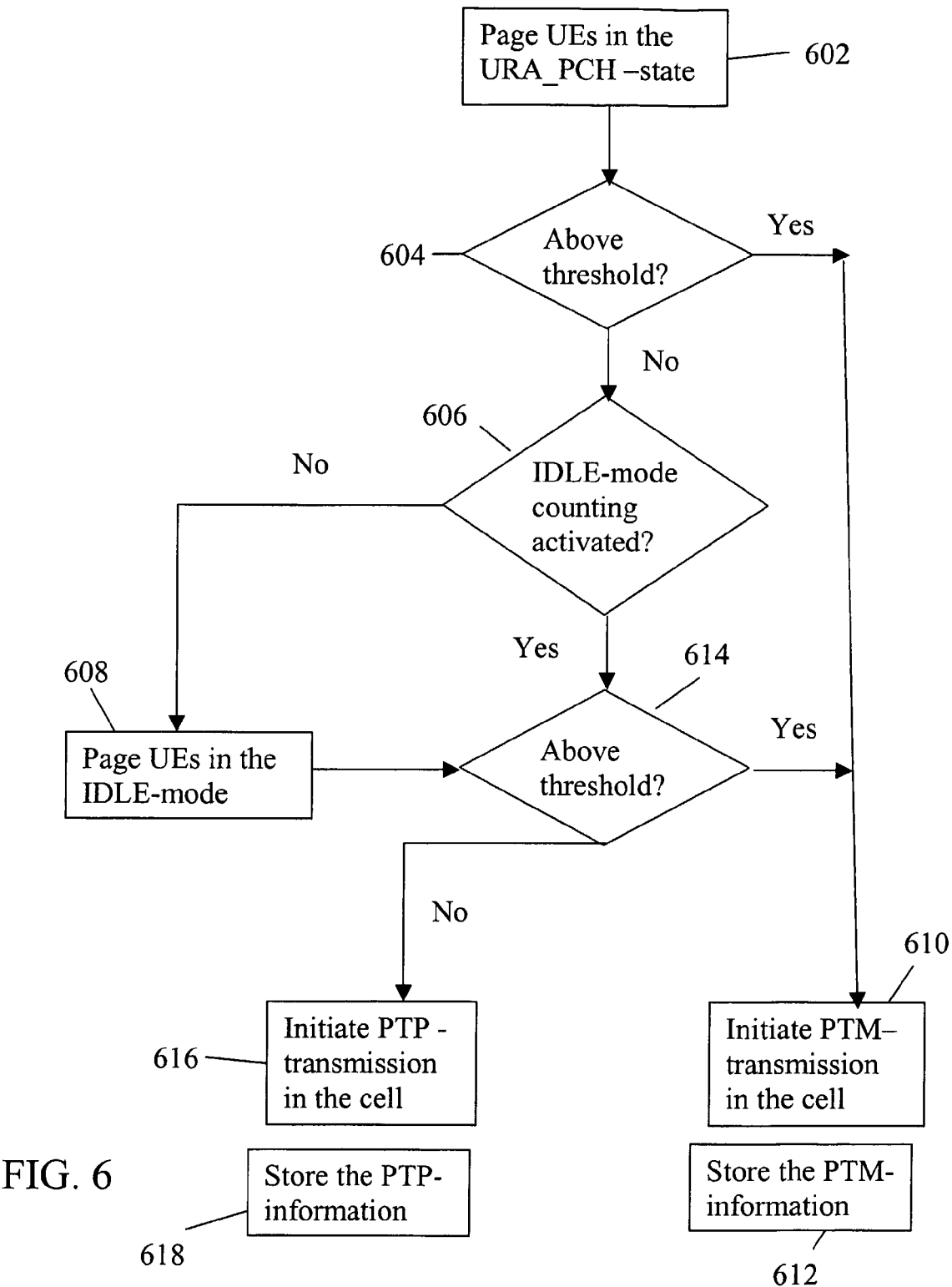
FIG. 6 is a flow diagram illustrating the second part of a counting procedure for a PTP/PTM transmission decision.

One exemplary embodiment of the counting procedure according to the fourth embodiment of this invention is described in the flow charts of FIGS. 5 and 6. The figures illustrate the method of collecting counting information by counting-by-linking, repetition correction and counting-by-paging, providing counting information to for PTP/PTM transmission decision. The methods are complementary, i.e. counting-by-linking provides accurate counting information for UE in all Connected states, except the URA_PCH-state, and counting-by-paging can be performed for UEs both in the Idle mode in all Connected mode-states, except the CELL_DCH-state. By comparing a counter value with a pre-defined threshold a decision is made regarding transmission according to the PTP or the PTM scheme in a cell. One separate cell counter may be provided for each state of the UEs, or alternatively only one, common cell counter. The UEs in the URA_PCH state may be counted by fractional counting per cell, or by individual paging that gives a more precise number of UEs interested of the MBMS transmission in the cell. The URA_PCH specific paging message may consist of the same paging message that is sent to the Idle mode UEs. If the RRC_IDLE-mode counting is activated, the number of RRC Idle UEs is transferred from the core network over the Iu interface at session start, and otherwise the RRC Idle mode UEs are paged individually.

In step 500 of FIG. 5 the CRNC receives a MBMS session start notification from the core network, and in step 502 the CRNC counts the MBMS UE context and the received Iur-links comprising MBMS UE information regarding MBMS-joined UEs in a cell in a first state (j). In step 504 is determined whether the repetition indicator is included in the MBMS session start, and if this is the case, the CRNC performs a repetition correction in step 506, by calculating either an MBMS PTP/PTM transmission number, according to (1) above, or an MBMS retransmission number, according to (2) above, and subtracting the calculated, predicted number of UEs having already received the MBMS session from the counted number of UEs in this first state. In step 508, the value of the cell counter is compared with a operator defined threshold value, and if the value is approximately above, the CRNC, in step 510, initiates PTM-transmission of the MBMS session in the cell. In step 512 the PTM information is stored in the corresponding MBMS UE contexts and in the MBMS UE information to be transferred to other RNCs (or to the core network). Otherwise, the next state (j+1) is considered in step 514, and in step 516 is determined whether the next state is the URA_PCH state. If not, the counting procedure and determination in steps 502-508 is repeated for this next state. If in step 516 the next state is determined as the URA_PCH state, step 518 determines whether fractional counting of UEs in the URA_PCH state is activated, and if this is the case, the counting procedure and determination according to steps 502-508 is performed for the URA_PCH-state. Otherwise, the second partial procedure of the counting procedure is initiated in step 600, i.e. counting by paging, which is illustrated in the flow chart in FIG. 6.

In step 602 in FIG. 6, the UEs in the URA_PCH-state are paged, and in step 604 it is determined whether the value of the cell counter is approximately above the threshold for PTM-transmission. If this is the case, PTM-transmission in the cell is initiated in step 610, and PTM-information is stored in the corresponding MBMS UE contexts and in the UE information to be transferred to other RNCs (or to the core network), in step 612. Otherwise, it is determined in step 606 whether Idle-mode counting is activated. The Idle-mode counting according to this invention involves that PTP/PTM information regarding a MBMS session is sent to the core network when a UE transits from a RRC Connected mode to the RRC Idle mode. Thereby, the SGSN is able to include this information in the MBMS session start to the RNC in case of a repetition of the MBMS session. If this Idle-mode counting is activated, step 614 determines whether the value of the cell counters is above said threshold. If not, paging of the UEs in the Idle mode is performed in step 608, after which the cell counter is compared with the threshold in step 614 again. If the cell counter is still not above the threshold, a PTP-transmission will be initiated in the cell in step 616, and PTP information is stored, in step 618, in the MBMS UE contexts and in the MBMS UE information transferred to other RNCs (or to the core network) for the UEs receiving the PTP transmission of the MBMS session.

By means of the counting procedure comprising two consecutive partial procedures, according to this fourth embodiment of the invention, i.e. a first counting by linking-procedure and a second, optional, counting by paging-procedure, of which the second procedure is only required if the number of UEs is approximately below an operator defined threshold for PTM-transmission in the cell after completion of the first procedure, unnecessary counting by paging is avoided, and expensive radio resources saved by minimising the signaling load over the Uu interface.

Figure 7A:
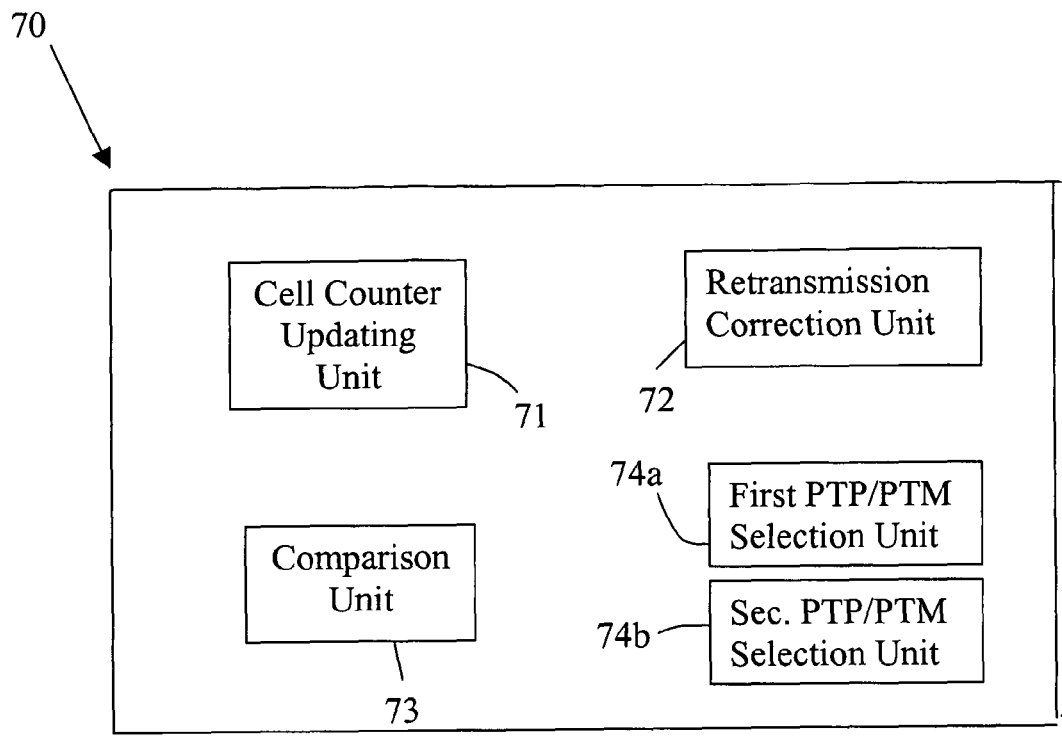
FIG. 7a is a block diagram illustration the counting means.

FIG. 7*a* is a block diagram illustrating an embodiment of counting means 70 in a radio network controller 4 according to this invention, the counting means comprising a Cell counter Updating unit 71 arranged to update a cell counter for each stored UE context and received UE link indicating a certain cell location; a Retransmission correction unit 72, arranged to perform repetition correction in the case of a retransmission of a multimedia session; a Comparison unit 73, arranged to compare the cell counter value with a pre-defined threshold value, and a PTP/PTM selection unit, comprising first and second selection units 74*a, b*. The first selection unit 74*a* is arranged to select PTM-transmission of a multimedia session if the counted number of UEs is approximately above said pre-defined threshold value and to perform counting-by-paging if the counted number of UEs is approximately below said threshold. The second selection unit 74*b* is arranged to select PTM-transmission of a multimedia session if the counted number of UEs is approximately above said pre-defined threshold value and to select PTP-transmission of said multimedia session if the counted number of UEs is approximately below said threshold.

Figure 7B:
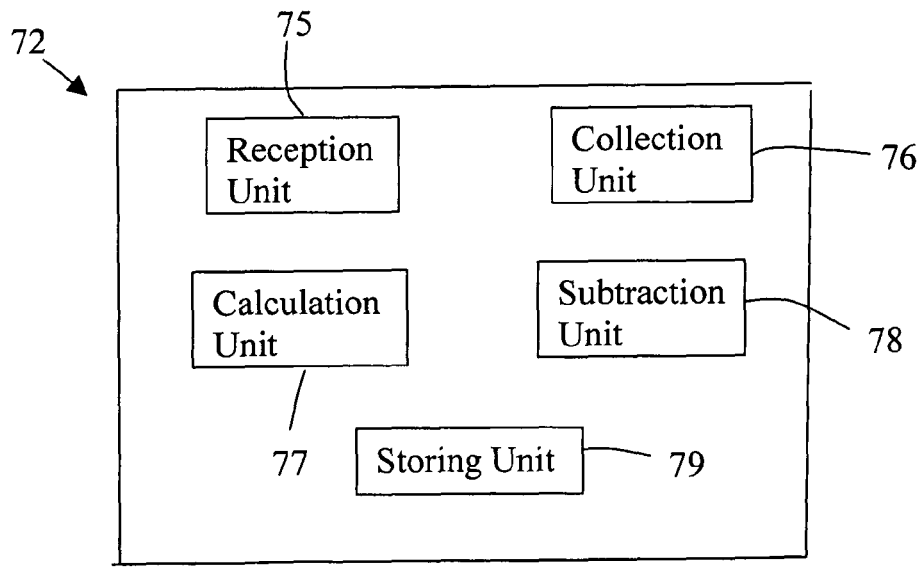
FIG. 7b is a block diagram illustrating retransmission correction means within the counting means.

FIG. 7b is a block diagram illustrating an embodiment of a Retransmission correcting unit 72, as illustrated in FIG. 7a, according to an embodiment of this invention, comprised in the counting means 70 of a radio network controller 4. A Reception unit 75 is arranged to receive a repetition indicator included in the multimedia session start notification from the core network, and a Collection unit 76 is arranged to collect PTP/PTM-information regarding previous transmissions of said multimedia service session stored in the UE contexts and in UE received from serving radio network controllers. A Calculation unit 77 is arranged to calculate a repetition correction value using said collected PTP/PTM-information, and a Subtraction unit 78 is arranged to correct a counted number of multimedia service joined UEs by subtracting the calculated repetition correction value. Further, a Storing unit 79 is arranged to store said repetition indicator and PTP/PTM information regarding said repetition of the multimedia service session in the UE contexts and in the UE links transferred to serving radio network controllers.

The invention has been described with reference to specific exemplary embodiments and figures only to illustrate the inventive concept, and the invention is not limited to the disclosed embodiments. Instead, the invention is intended to cover various modification within the scope of the appended claims.

The invention claimed is:

1. A method in a radio network controller functioning as a controlling radio network controller (CRNC) within a radio access network having a plurality of other radio network controllers (RNCs) for counting of multimedia service joined mobile terminals located in a cell for a point-to-point (PTP)/point-to-multipoint (PTM) transmission decision, characterised by a retransmission correction of a counted number of mobile terminals in case of a repetition of a multimedia service session, using an estimated number of the mobile terminals having received a previous transmission of said multimedia service session from any of the other radio network controllers, said retransmission correction comprising the steps of:
receiving a repetition indicator in a multimedia session start notification from a core network;
collecting PTP/PTM information regarding previous transmissions of said multimedia service session stored in the mobile terminal contexts and in mobile terminal information received in links from serving radio network controllers;
calculating a repetition correction value using said repetition indicator and said collected PTP/PTM information to estimate the number of mobile terminals located in the cell which have received the previous transmission of the multimedia service session;
correcting the counted number of the multimedia service joined mobile terminals using said repetition correction value; and
storing said repetition indicator and said PTP/PTM information regarding said repetition of the multimedia service session in the mobile terminal contexts.

2. The method in a controlling radio network controller according to claim 1, wherein the repetition indicator comprising a repetition flag.

3. The method in a controlling radio network controller according to claim 2, wherein the calculation of the repetition correction value involving adding the number of mobile terminals having received a previous PTP-transmission of said multimedia service session to a predicted number of mobile terminals having received a previous PTM transmission of said multimedia service session.

4. The method in a controlling radio network controller according to claim 1, wherein the repetition indicator comprising a repetition counter.

5. The method in a controlling radio network controller according to claim 4, characterised by the calculation of the repetition correction value involving predicting the number of mobile terminal having received a PTM-transmission of said multimedia service session in any of the previous transmission, using an estimated mean value of the number of mobile terminals located in a cell.

6. The method in a controlling radio network controller according to claim 1, characterised by transferring mobile terminal context information comprising PTP/PTM information regarding a received multimedia service session to the core network at a connection release of a mobile terminal.

7. The method in a controlling radio network controller according to claim 6, characterised by the counting of multimedia service joined mobile terminals comprising Idle mode counting, involving the reception of mobile terminal information from the core network, comprising PTP/PTM information regarding a received multimedia service session.

8. The method in a controlling radio network controller according to claim 1, characterised by the counting of the multimedia service joined mobile terminals comprising a first counting by linking-procedure, and a consecutive and optional counting by paging-procedure.

9. The method in a controlling radio network controller according to claim 8, characterised by the counting of the multimedia service joined mobile terminals in a cell comprising the following steps:
updating a cell counter for each stored mobile terminal contexts and received mobile terminal link indicating the cell location;
comparing the cell counter value with a predefined threshold value;
selecting PTM-transmission in the cell if the cell counter value is approximately higher than said thresholds value and selecting a counting by paging-procedure if the cell counter value is lower than said threshold value;
following the counting by paging-procedure, comparing the cell counter value with said pre-defined threshold value;
selecting PTM-transmission in the cell if the cell counter value is approximately higher than said threshold value, and selecting PTP-transmission in the cell if the cell counter value is lower than said threshold value.

10. The method in a controlling radio network controller according to claim 8, wherein the counting by paging-procedure comprising paging of mobile terminals in the URA_PCH-state, in case fractional URA_PCH-state counting is not activated.

11. The method in a controlling radio network controller according to claim 8, wherein the counting by paging-procedure comprising paging of mobile terminals in the Idle mode, in case Idle mode counting is not activated.

12. The method according to claim 1, wherein said radio access network is a UTRAN (Universal Mobile Telecommunications Terrestrial Radio Access Network) and said mobile terminal is a UE and said multimedia service is a Multimedia Broadcasting/Multicasting Service (MBMS), according to the 3GPP standard.

13. A radio network controller capable of functioning as a controlling radio network controller (CRNC) within a radio access network having a plurality of other radio network controllers (RNCs), the radio network controller provided with counting means for counting of multimedia service joined mobile terminals located in a cell for a point-to-point (PTP)/point-to-multipoint (PTM) transmission decision, characterised by the counting means comprising retransmission correction means arranged to correct a counted number of mobile terminals in the case of a repetition of a multimedia service session, using an estimated number of the mobile terminals having received a previous transmission of said multimedia service session from any of the other radio network controllers, wherein the retransmission correction means further comprises:

reception means for receiving a repetition indicator in a multimedia session start notification from a core network;

collection means for collecting PTP/PTM information regarding previous transmissions of said multimedia service session stored in the mobile terminal contexts and in mobile terminal information received in links from serving radio network controllers;

calculating means for calculating a repetition correction value using said repetition indicator and said collected PTP/PTM information to estimate the number of mobile terminals located in the cell which have received the previous transmission of the multimedia service session;

correction means for correcting the counted number of the multimedia service joined mobile terminals using said repetition correction value;

storinq means for storing said repetition indicator and said PTP/PTM information regarding said repetition of the multimedia service session in the mobile terminal contexts.

14. The radio network controller according to claim 13, wherein the repetition indicator comprises a repetition flag.

15. The radio network controller according to claim 14, wherein the calculation of the repetition correction value involves an addition of the number of mobile terminals having received a previous PTP-transmission of said multimedia service session to a predicted number of mobile terminals having received a previous PTM transmission of said multimedia service session.

16. The radio network controller according to claim 13, wherein the repetition indicator comprises a repetition counter.

17. The radio network controller according to claim 16, wherein the calculation of the repetition correction value involves a prediction of the number of mobile terminal having received a PTM transmission of said multimedia service session in any of the previous transmission, by the use of an estimated mean value of the number of mobile terminals located in a cell.

18. The radio network controller according to claim 13, characterised in that said counting means is arranged to transfer mobile terminal context information comprising PTP/PTM information regarding a received multimedia service session to the core network at a connection release of a mobile terminal.

19. The radio network controller according to claim 18, characterised in that the counting means is arranged to perform an Idle mode counting procedure in the counting of multimedia service joined mobile terminals, said Idle mode counting procedure involving the reception of mobile terminal information from the core network, comprising PTP/PTM information regarding a received multimedia service session.

20. The radio network controller according to claim 13, characterised in that the counting means is arranged to count the multimedia service joined mobile terminals by means of a first counting by linking-procedure and a consecutive and optional counting by paging-procedure.

21. The radio network controller according to claim 20, characterised in that the counting means further comprises:

updating means for updating a cell counter for each stored mobile terminal contexts and received mobile terminal link indicating the cell location;

comparison means for comparing the cell counter value with a pre-defined threshold value;

first selecting means for selecting PTM-transmission in the cell if the cell counter value is approximately higher than said thresholds value and to select a counting by paging-procedure if the cell counter value is lower than said threshold value;

second selecting means for selecting PTM-transmission in the cell if the cell counter value, following the counting by paging-procedure, is approximately higher than said thresholds value, and to select PTP-transmission in the cell if the cell counter value is lower than said threshold value.

22. The radio network controller according to claim 20, wherein the counting by paging-procedure comprises paging of mobile terminals in the URA_PCH-state, in case fractional URA_PCH-state counting is not activated.

23. The radio network controller according to claim 20, wherein the counting by paging-procedure comprises paging of mobile terminals in the Idle mode, in case Idle mode counting is not activated.

24. The radio network controller according to claim 13, wherein said radio access network is a UTRAN (Universal Mobile Telecommunications Terrestrial Radio Access Network) and said mobile terminal is a UE and said multimedia service is a Multimedia Broadcasting/Multicasting Service (MBMS), according to the 3GPP standard.

* * * * *